United States Patent
Diwan et al.

(10) Patent No.: US 11,555,953 B2
(45) Date of Patent: Jan. 17, 2023

(54) OPTICAL DEVICE WITH WIRES AND ORGANIC MOIETIES

(71) Applicant: Moxtek, Inc., Orem, UT (US)

(72) Inventors: Anubhav Diwan, Provo, UT (US); Bradley R. Williams, Pocatello, ID (US); R. Stewart Nielson, Pleasant Grove, UT (US)

(73) Assignee: Moxtek, Inc., Orem, UT (US)

( * ) Notice: Subject to any disclaimer, the term of this patent is extended or adjusted under 35 U.S.C. 154(b) by 343 days.

(21) Appl. No.: 16/992,423

(22) Filed: Aug. 13, 2020

(65) Prior Publication Data

US 2021/0063623 A1 Mar. 4, 2021

Related U.S. Application Data

(60) Provisional application No. 62/949,568, filed on Dec. 18, 2019, provisional application No. 62/894,484, filed on Aug. 30, 2019, provisional application No. 62/892,135, filed on Aug. 27, 2019.

(51) Int. Cl.
*G02B 5/30* (2006.01)
*G02B 1/00* (2006.01)
*G02F 1/1335* (2006.01)

(52) U.S. Cl.
CPC .......... *G02B 5/3058* (2013.01); *G02B 1/002* (2013.01); *G02B 5/305* (2013.01); *G02B 5/3008* (2013.01); *G02F 1/133548* (2021.01); *C09K 2323/031* (2020.08)

(58) Field of Classification Search
CPC .................. G02B 5/3058; G02F 1/133548
See application file for complete search history.

(56) References Cited

U.S. PATENT DOCUMENTS

| 9,995,864 | B2 | 6/2018 | Diwan et al. |
| 2016/0291209 | A1* | 10/2016 | Diwan .................... C23C 14/08 |
| 2019/0317260 | A1 | 10/2019 | Williams et al. |
| 2020/0173021 | A1 | 6/2020 | Linford et al. |

* cited by examiner

*Primary Examiner* — Ryan S Dunning
(74) *Attorney, Agent, or Firm* — Thorpe, North & Western, LLP

(57) ABSTRACT

An optical device can comprise wires 12 on a face of a substrate 11, with channel(s) 13 between adjacent wires 12. Each wire 12 can include embedded organic moieties. Each wire 12 can include multiple ribs 31. Part or all of the wire 12, the substrate 11, or both can have a high refractive index n and a low extinction coefficient k. The optical device can have reduced separation of layers of different materials during flexing and temperature changes. The optical device can be manufactured by a method designed for improved manufacturability.

20 Claims, 2 Drawing Sheets

Figure 4:
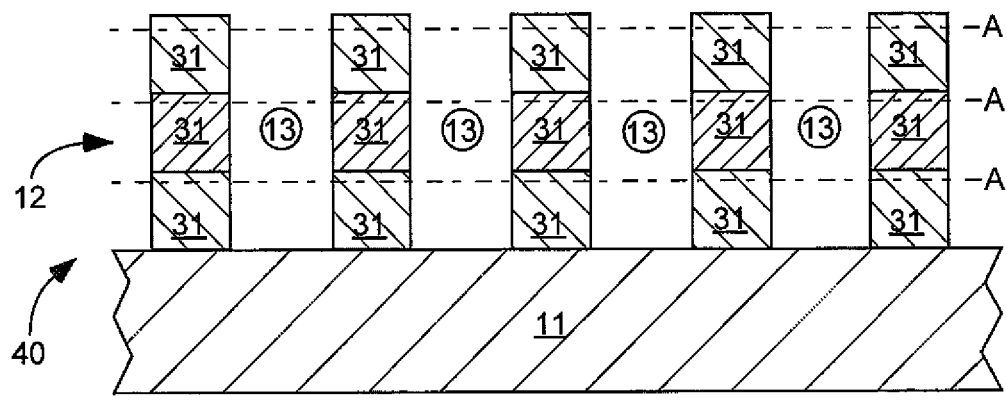

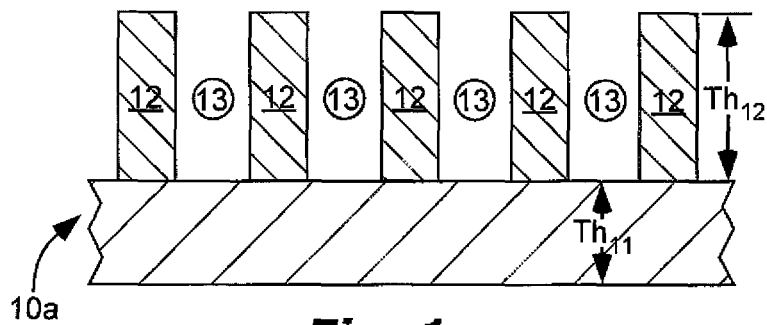
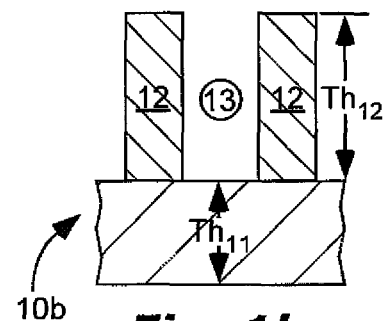
Fig. 1a  Fig. 1b
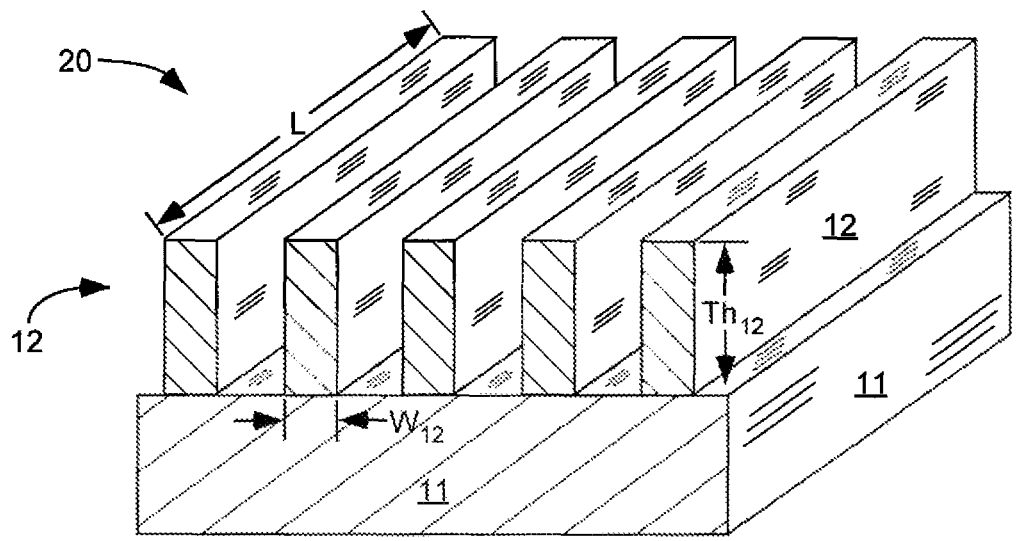
Fig. 2
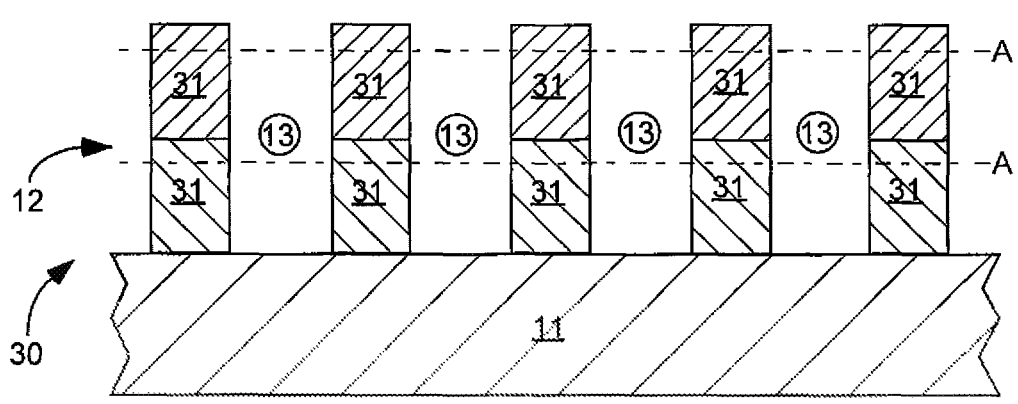
Fig. 3

US 11,555,953 B2

OPTICAL DEVICE WITH WIRES AND ORGANIC MOIETIES

CLAIM OF PRIORITY

This application claims priority to: U.S. Provisional Patent Application No. 62/892,135, filed on Aug. 27, 2019; U.S. Provisional Patent Application No. 62/894,484, filed on Aug. 30, 2019; and to U.S. Provisional Patent Application No. 62/949,568, filed on Dec. 18, 2019; all of which are incorporated herein by reference.

FIELD OF THE INVENTION

The present application is related generally to wire grid polarizers.

BACKGROUND

Optical devices can include multiple layers of different materials bonded together. These layers can separate during flexing of the optical device or during temperature changes due to different coefficients of thermal expansion of the different materials. It would be helpful to minimize or eliminate such separation of layers.

Deposition of some optical materials can be difficult and slow, and can result in additional defects. Some deposition techniques heat the optical device, which can adversely affect the grain structure and stoichiometry of the deposited material. Some deposition techniques can result in undesirable variation of density throughout the layer. It can be difficult to etch certain materials. It would be helpful to improve manufacturability of optical devices.

SUMMARY

It has been recognized that it would be advantageous to minimize or eliminate separation of layers of different materials of optical devices during flexing and during temperature changes. It has been recognized that it would be advantageous to improve manufacturability of optical devices. The present invention is directed to various embodiments of, and methods of making, optical devices that satisfy these needs. Each embodiment may satisfy one, some, or all of these needs.

The optical device can comprise wires on a face of a substrate, with channel(s) between adjacent wires. Each wire can include embedded organic moieties. The method can include applying an uncured layer on a substrate, then curing the uncured layer to form a cured layer. The substrate, the wires, rib(s) in the wires, the cured layer, or combinations thereof can have a refractive index $n \geq 1.7$ and an extinction coefficient $k \leq 0.1$.

BRIEF DESCRIPTION OF THE DRAWINGS (DRAWINGS MIGHT NOT BE DRAWN TO SCALE)

FIG. 1a is a schematic, cross-sectional side-view of an optical device 10a, including wires 12 on a face of a substrate 11, with channels 13 between adjacent wires 12, in accordance with an embodiment of the present invention.

FIG. 1b is a schematic, cross-sectional side-view of an optical device 10b, including two wires 12 on a face of a substrate 11, with a channel 13 between the two wires 12, in accordance with an embodiment of the present invention.

FIG. 2 is a schematic perspective-view of an optical device 20, including an array of wires 12 on a face of a substrate 11, with channels 13 between adjacent wires 12, the wires being parallel and elongated, in accordance with an embodiment of the present invention.

FIG. 3 is a schematic, cross-sectional side-view of an optical device 30, similar to optical devices 10a, 10b, and 20, but each wire 12 further comprising two ribs 31, in accordance with an embodiment of the present invention.

FIG. 4 is a schematic, cross-sectional side-view of optical device 40, similar to optical devices 10a, 10b, and 20, but each wire 12 further comprising three ribs 31, in accordance with an embodiment of the present invention.

Figure 5:
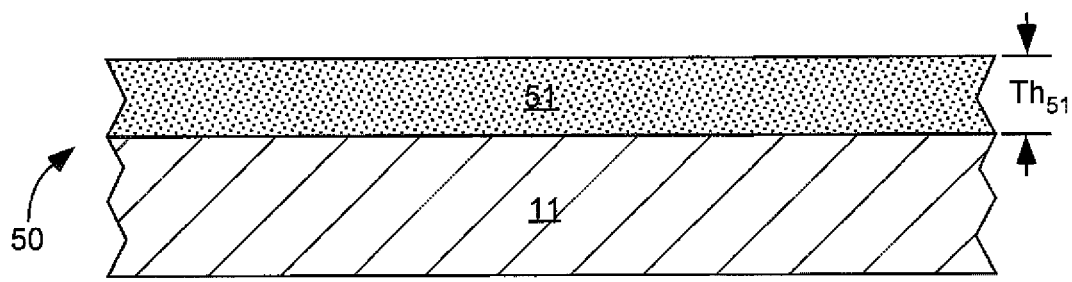

FIG. 5 is a schematic, cross-sectional side-view illustrating a step 50 in a method of making an optical device, including applying an uncured layer 51 on a substrate 11, in accordance with an embodiment of the present invention.

Figure 6:
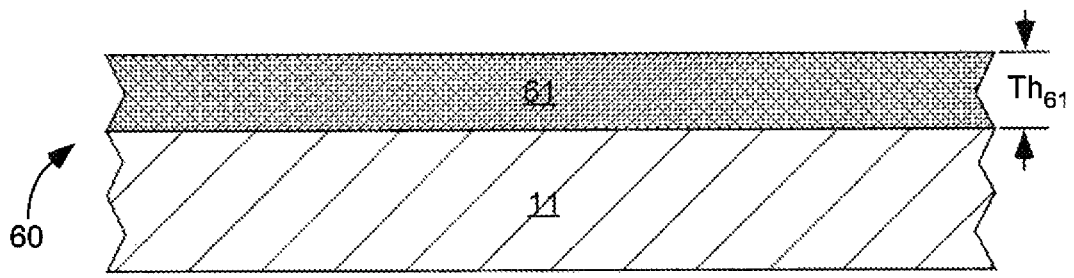

FIG. 6 is a schematic, cross-sectional side-view illustrating a step 60 in a method of making an optical device, which can follow step 50, including curing the uncured layer 51 to form a cured layer 61, in accordance with an embodiment of the present invention.

Figure 7:
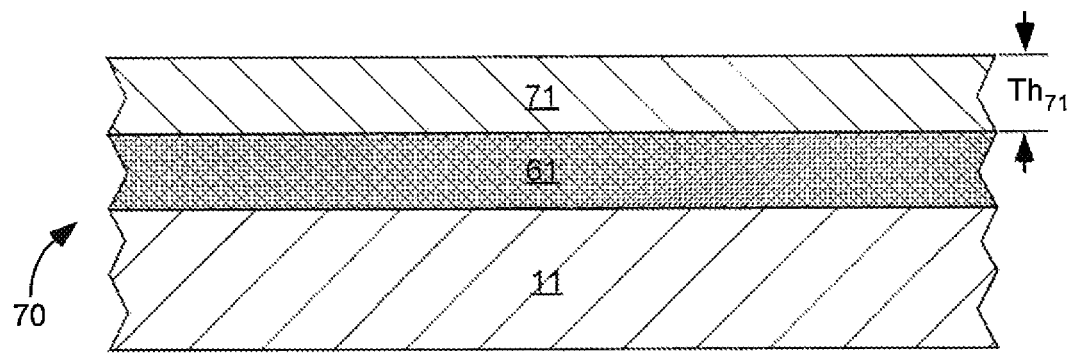

FIG. 7 is a schematic, cross-sectional side-view illustrating a step 70 in a method of making an optical device, which can follow step 60, including sputter deposition of a thin film 71 onto the cured layer 61, in accordance with an embodiment of the present invention.

DEFINITIONS

The following definitions, including plurals of the same, apply throughout this patent application.

As used herein, the term "on" means located directly on or located above with some other solid material between.

As used herein, the term "elongated" means that a length L of the wires 12 is substantially greater than wire width W or wire thickness $Th_{12}$. For example, L can be $\geq 10$ times, $\geq 100$ times, $\geq 1000$ times, or $\geq 10,000$ times larger than wire width W, wire thickness $Th_{12}$, or both. See FIG. 2.

As used herein, the term "parallel" means exactly parallel, parallel within normal manufacturing tolerances, or nearly parallel, such that any deviation from exactly parallel would have negligible effect for ordinary use of the device.

As used herein, the term "made of" means that the material has the specified material composition with the exception of unintentional impurities.

The metal oxides listed herein include combinations of the metal and oxygen in any ratio, including non-stoichiometric combinations.

As used herein, the term "substrate" means a base material, such as for example a glass wafer. Unless specified otherwise in the claims, the term "substrate" also includes any thin film(s) sandwiched between the glass wafer and the wires of the polarizer. The substrate can be thick in an optical sense, meaning substantially thicker than a maximum wavelength of light in the wavelength range of use. For example, a thickness $Th_{11}$ of the substrate can be $\geq 0.1$ mm, $\geq 0.35$ mm, or $\geq 0.6$ mm.

Materials used in optical structures can absorb some light, reflect some light, and transmit some light. The following definitions distinguish between materials that are primarily absorptive, primarily reflective, or primarily transparent. Each material can be considered to be absorptive, reflective, or transparent in a wavelength range of intended use, across the ultraviolet spectrum, across the visible spectrum, across the infrared spectrum, or combinations thereof, and can have a different property in a different wavelength range. Materials are divided into absorptive, reflective, and transparent based on reflectance R, the real part of the refractive index n, and the imaginary part of the refractive index/extinction coefficient k. Equation 1 is used to determine the reflectance R of the interface between air and a uniform slab of the material at normal incidence:

$$R = \frac{(n-1)^2 + k^2}{(n+1)^2 + k^2} \quad \text{Equation 1}$$

Unless explicitly specified otherwise herein, materials with k≤0.1 in the wavelength range are "transparent" materials, materials with k>0.1 and R≤0.6 in the specified wavelength range are "absorptive" materials, and materials with k>0.1 and R>0.6 in the specified wavelength range are "reflective" materials. If explicitly so stated in the claims, materials with k>0.1 and R≥0.7, R≥0.8, or R≥0.9, in the specified wavelength range, are "reflective" materials.

As used herein, the ultraviolet spectrum means ≥10 nm & <400 nm, the visible spectrum means ≥400 nm & <700 nm, and the infrared spectrum means ≥700 nm & ≤1 mm.

Unless explicitly noted otherwise herein, all temperature-dependent values are such values at 25° C.

DETAILED DESCRIPTION

As illustrated in FIGS. 1a-1b, optical devices 10a and 10b are shown comprising wires 12 on a face of a substrate 11, with channel(s) 13 between adjacent wires 12. The channels can be filled with air, another gas, vacuum, liquid, solid material, or combinations thereof. The wires 12 can extend in multiple directions and can have multiple thicknesses $Th_{12}$, like a metamaterial polarizer. Alternatively, as illustrated on optical device 20 in FIG. 2, the wires 12 can be parallel and elongated.

Optical devices 10a, 10b, and 20 can each be a wire grid polarizer (WGP), a waveguide, or other optical device. The optical devices 10a and 20 can include many more wires 12 and channels 13 than illustrated. Alternatively, optical device 10b can include only two wires 12 with a single channel 13 between. Optical device 10b can be a waveguide.

Each wire 12 can include a reflective rib, a transparent rib, an absorptive rib, or combinations thereof, in any order. As illustrated on optical device 30 in FIG. 3, each wire 12 can include two ribs 31. As illustrated on optical device 40 in FIG. 4, each wire 12 can include three ribs 31. Each rib 31 can be a different material from other rib(s) in the same wire 12. Each array A of ribs 31, in a single plane parallel to the face of the substrate, can be a single material. Each array A of ribs 31 can be a reflective rib, a transparent rib, or an absorptive rib.

Following are example values of the real part of the refractive index n and the extinction coefficient k for parts of the optical devices 10, 20, 30, and 40. The n and k values herein can be across the ultraviolet spectrum, across the visible spectrum, across the infrared spectrum, or combinations thereof.

The substrate 11 can be made of silicon dioxide, with a relatively low real part of the refractive index $n_S$, or can have a higher $n_S$, depending on the type of optical device 10 or 20. The substrate 11 can have a low extinction coefficient $k_S$. The substrate 11 can be made of or can include an oxide of hafnium, lead, niobium, tantalum, titanium, tungsten, zirconium, or combinations thereof. For example, the substrate 11 can have: $n_S$≥1.3, $n_S$≥1.7, $n_S$≥1.8, $n_S$≥1.9, $n_S$≥2.0, or $n_S$≥2.2; $n_S$≤1.5, $n_S$≤2.0, or $n_S$≤3.0; $k_S$≤0.0001, $k_S$≤0.001, $k_S$≤0.01, or $k_S$≤0.1; or combinations thereof.

In one embodiment, each wire 12 can be transparent. Each wire 12 can have: $n_W$≥1.3, $n_W$≥1.7, $n_W$≥1.8, $n_W$≥1.9, $n_W$≥2.0, or $n_W$≥2.2; $n_W$≤1.5, $n_W$≤2.0, or $n_W$≤3.0; $k_W$≤0.0001, $k_W$≤0.001, $k_W$≤0.01, or $k_W$≤0.1; or combinations thereof. $n_W$ is the real part of the refractive index and $k_W$ is the extinction coefficient of the wires 12.

In one embodiment, the transparent rib can have: $n_T$≥1.3, $n_T$≥1.7, $n_T$≥1.8, $n_T$≥1.9, $n_T$≥2.0, or $n_T$≥2.2; $n_T$≤1.5, $n_T$≤2.0, or $n_T$≤3.0; $k_T$≤0.0001, $k_T$≤0.001, $k_T$≤0.01, or $k_T$≤0.1; or combinations thereof. $n_T$ is the real part of the refractive index and $k_T$ is the extinction coefficient of the transparent rib. Example materials of the transparent rib include hafnium, lead, niobium, tantalum, titanium, tungsten, zirconium, and combinations thereof. The transparent rib can include oxides of hafnium, lead, niobium, tantalum, titanium, tungsten, zirconium, or combinations thereof.

Each wire 12 can include embedded organic moieties. The reflective rib, the transparent rib, the absorptive rib, or combinations thereof can include embedded organic moieties. Inclusion of organic moieties can improve flexibility of the optical device. Such flexibility can be useful if the final device must be curved across another device, such as for example a lens. Such flexibility can be useful for layers of the optical device maintaining contact during thermal expansion. This flexibility can even result in different materials maintaining contact in spite of a relatively large difference in coefficient of thermal expansion.

For example, ≥0.01%, ≥0.1%, 1%, ≥10%, or ≥25% of atoms can be part of organic moieties in the wire 12, the reflective rib, the transparent rib, the absorptive rib, or combinations thereof. For example, ≤75%, ≤50%, ≤25%, ≤10%, or ≤5% of atoms can be part of organic moieties in the wire 12, the reflective rib, the transparent rib, the absorptive rib, or combinations thereof. A remainder of each such rib can be inorganic.

For example, a mass percent of the organic moieties in the wire 12, the reflective rib, the transparent rib, the absorptive rib, or combinations thereof can be ≥0.01%, ≥0.1%, ≥1%, ≥10%, or ≥25%; and ≤75%, ≤50%, ≤25%, ≤10%, or ≤5%. A remainder of each such rib can be inorganic.

It can be helpful for the organic moieties to be small moieties in order to avoid adverse effect on optical properties, to balance flexibility and hardness, to achieve desired density, and to facilitate deposition. For example, each organic moiety can include or can be —$CH_3$, —$CH_2CH_3$, —$CH_2CH_2CH_3$— or combinations thereof. As another example, all organic moieties can include 1 carbon atom, ≤2 carbon atoms, ≤3 carbon atoms, ≤5 carbon atoms, or ≤10 carbon atoms. As another example, all organic moieties can have a molecular weight of ≥14 grams/mol, ≥25 grams/mol, or ≥50 grams/mol; and ≤16 grams/mol, ≤30 grams/mol, ≤45 grams/mol, or ≤100 grams/mol.

Method

A method of making an optical device can comprise applying an uncured layer 51 on a substrate 11 (see step 50 in FIG. 5); and curing the uncured layer 51 to form a cured layer 61 (see step 60 in FIG. 6). These steps 50 and 60 can be performed in this order or simultaneously. Components of the optical device, and the optical device itself, can have properties as described above. Steps 50 and 60 can be repeated for multiple layers. Each repeat of steps 50 and 60 can be performed with a different material. Each cured layer 61 can be reflective, transparent, or absorptive across the ultraviolet spectrum, across the visible spectrum, across the infrared spectrum, or combinations thereof. The method can further comprise etching the cured layer(s) to form wires 12, and thus to make optical device 10, 20, 30, or 40.

Each cured layer 61 can have, independently: $n_C \geq 1.3$, $n_C \geq 1.7$, $n_C \geq 1.8$, $n_C \geq 1.9$, $n_C \geq 2.0$, or $n_C \geq 2.2$; $n_C \leq 1.5$, $n_C \leq 2.0$, or $n_C \leq 3.0$; $k_C \leq 0.0001$, $k_C \leq 0.001$, $k_C \leq 0.01$, or $k_C \leq 0.1$; or combinations thereof. $n_C$ is the real part of the refractive index and $k_C$ is the extinction coefficient of the cured layer 61. The cured layer 61 can have embedded organic moieties in percentages as specified above. The substrate 11 can have $n_S$ and $k_S$ as described above.

In one embodiment, the uncured layer 51 can be a liquid with solid inorganic nanoparticles dispersed throughout a continuous phase. Curing, or causing a chemical reaction in, the uncured layer 51 can include forming the uncured layer 51 into a solid, interconnecting network of the inorganic nanoparticles, defining the cured layer 61. In another embodiment, the uncured layer 51 can be a colloidal suspension including a dispersed phase and a continuous phase. Curing, or causing a chemical reaction in, the colloidal suspension can include removing the continuous phase to form a solid, defining the cured layer 61, The solid can be inorganic. The inorganic nanoparticles, the dispersed phase, or both can include metal atoms bonded to organic moieties. In one aspect, each metal atom can be bonded to no more than one organic moiety. Examples of the organic moieties include —$CH_3$ and —$CH_2CH_3$. Consequently, the cured layer 61 can include embedded organic moieties. These embedded organic moieties can be useful for changing properties of the cured layer 61, such as changing its optical properties and hardness.

In another embodiment, the uncured layer 51 can be a solution including molecules in a solvent, and the cured layer 61 can be formed by reacting the molecules to form a solid of the metal atoms interconnected with each other. The solvent can include water and an organic liquid. The molecules can include metal atoms bonded to reactive groups $R^1$. Examples of the metal atoms include hafnium, lead, niobium, tantalum, titanium, tungsten, and zirconium. Each metal atom can include $\geq 1$ bond or $\geq 2$ bonds to the reactive groups and $\geq 1$ bond or $\geq 2$ bonds directly to an organic moiety.

Each reactive-group $R^1$ can be independently —Cl, —$OR^2$, —$OCOR^2$, or —$N(R^2)_2$. Each $R^2$ can be independently —$CH_3$, —$CH_2CH_3$, —$CH_2CH_2CH_3$, or any alkyl group. The alkyl group has at least one carbon atom, but can be small, such as for example with $\leq 2$ carbon atoms, $\leq 3$ carbon atoms, $\leq 5$ carbon atoms, or $\leq 10$ carbon atoms.

Each metal atom can include $\geq 1$ bond or $\geq 2$ bonds to the reactive groups and $\geq 1$ bond or $\geq 2$ bonds directly to an organic moiety $R^3$. Examples of the organic moiety include —$CH_3$, —$CH_2CH_3$, and —$CH_2CH_2CH_3$. Examples of the molecules include $(R^3)Hf(R^1)_3$, $(R^3)Pb(R^1)$, $(R^3)Nb(R^1)_4$, $(R^3)Ta(R^1)_4$, $(R^3)Ti(R^1)_3$, $(R^3)W(R^1)_5$, $(R^3)Zr(R^1)_3$.

Forming the uncured layer 51 into the cured layer 61 can include evaporation of at least some liquid, and such evaporation can be combined with the curing steps above. In one embodiment, all liquid initially in the uncured layer 51 either reacts to form a solid (the cured layer 61) or is evaporated. Forming the uncured layer 51 into the cured layer 61 can include use of ultraviolet light, heat or both. Integrity of the cured layer 61 can be improved by curing at a relatively low temperature, such as for example $\geq 30°$ C., $\geq 50°$ C., or $\geq 100$ and $\leq 150°$ C., $\leq 200°$ C., $\leq 250°$ C., or $\leq 300°$ C.

As illustrated in FIG. 7, the methods above can further comprise sputter deposition of a thin film 71 onto the cured layer 61. The thin film 71 can be any material with desired optical properties, properties for protection of the polarizer, or both. The thin film 71 can be etched with the cured layer 61 and can become a rib 31 in the final wire 12, can be used as an etch mask, or both. The thin film 71 can be reflective, absorptive, or transparent across the ultraviolet spectrum, across the visible spectrum, across the infrared spectrum, or combinations thereof, as specified in the claims. Sputter deposition of the thin film 71 can reduce voids in the cured layer 61.

Forming the uncured layer 51 by spin coating then baking, spin coating then baking again, and perhaps repeated more times, can improve uniformity of the final cured layer 61. Time of each spin coat depends on desired thickness and on the spin coater. Example times include $\geq 2$ seconds, $\geq 4$ seconds, or $\geq 6$ seconds and $\leq 10$ seconds, $\leq 20$ seconds, or 30 seconds for each spin coat. Examples of speed of each spin coat include $\geq 100$ rpm, $\geq 500$ rpm, $\geq 1000$ rpm, or $\geq 1500$ rpm; and $\leq 2500$ rpm, $\leq 3000$ rpm, $\leq 4000$ rpm, or $\leq 8000$ rpm. Examples of temperature of each bake include $\geq 30°$ C., $\geq 50°$ C., $\geq 100°$ C., or $\geq 150°$ C.; and $\leq 250°$ C., $\leq 300°$ C., or $\leq 400°$ C.

Example thickness $Th_{51}$ of the uncured layer 51, thickness $Th_{61}$ of the cured layer 61, and thickness $Th_{71}$ of the thin film 71 include $\geq 10$ nm, $\geq 50$ nm, $\geq 100$ nm, $\geq 200$ nm and $\leq 300$ nm, $\leq 600$ nm, or $\leq 1000$ nm. Such thickness $Th_{51}$, $Th_{61}$, and $Th_{71}$ can be a maximum, minimum, or average of the layer.

Some materials, such as for example titanium oxide, can be very difficult to etch. Titanium oxide formed by the above methods can be easier to etch, and thus can improve manufacturability of the optical devices. Sputter deposition can be difficult and slow; can heat the optical device, which can adversely affect the grain structure and stoichiometry of the deposited material; and can result in undesirable variation of density throughout the deposited layer. In contrast, the methods noted above can be performed more quickly, at a relatively lower temperature, with reduced density variation.

What is claimed is:

1. A wire grid polarizer (WGP) comprising:
   wires on a face of a substrate, with channels between adjacent wires;
   each wire including a reflective rib and a transparent rib;
   the transparent rib having a real part of a refractive index $n_T \geq 1.7$ and an extinction coefficient $k_T \leq 0.1$, across the ultraviolet spectrum, across the visible spectrum, across the infrared spectrum, or combinations thereof; and
   $\geq 0.1\%$ and $\leq 50\%$ of atoms in the transparent rib being part of organic moieties.

2. The WGP of claim 1, wherein the transparent rib comprises an oxide of hafnium, lead, niobium, tantalum, titanium, tungsten, zirconium, or combinations thereof.

3. The WGP of claim 1, wherein $n_T \geq 2.0$ across the visible spectrum.

4. The WGP of claim 1, wherein a mass percent of the organic moieties in the transparent rib is $\geq 0.1\%$ and $\leq 20\%$.

5. The WGP of claim 1, wherein the organic moieties include —$CH_3$, —$CH_2CH_3$, or both.

6. The WGP of claim 1, wherein all organic moieties include $\leq 3$ carbon atoms.

7. The WGP of claim 1, wherein $\geq 1\%$ and $\leq 25\%$ of atoms in the transparent rib are part of organic moieties.

8. The WGP of claim 1, wherein $\geq 0.1\%$ and $\leq 50\%$ of atoms in the reflective rib are part of organic moieties.

9. The WGP of claim 1, wherein each wire further comprises an absorptive rib and $\geq 0.1\%$ and $\leq 50\%$ of atoms in the absorptive rib are part of organic moieties.

10. A wire grid polarizer (WGP) comprising:
wires on a face of a substrate, with channels between adjacent wires, each wire including embedded organic moieties;
each wire includes a reflective rib;
in the reflective rib ≥0.1% and ≤50% of atoms are part of the organic moieties; and
each reflective rib is separated from each adjacent reflective rib by one of the channels, and each reflective rib does not touch adjacent reflective ribs.

11. The WGP of claim 10, wherein a mass percent of the organic moieties in the wire is ≥0.1% and ≤20%.

12. The WGP of claim 10, wherein the organic moieties include —$CH_3$, —$CH_2CH_3$, or both.

13. The WGP of claim 10, wherein all organic moieties include ≤3 carbon atoms.

14. A wire grid polarizer (WGP) comprising:
wires on a face of a substrate, with channels between adjacent wires, each wire including embedded organic moieties;
each wire includes a reflective rib plus a transparent rib, an absorptive rib, or both;
in the reflective rib, in the transparent rib, in the absorptive rib, or combinations thereof ≥0.1% and ≤50% of atoms are part of the organic moieties; and
each wire includes the absorptive rib and >1% and ≤25% of atoms in the absorptive rib are part of organic moieties.

15. An optical device comprising:
wires on a face of a substrate, with a channel between adjacent wires;
the substrate having a real part of the refractive index $n_S \geq 1.7$ and an extinction coefficient $k_S \leq 0.1$, across the ultraviolet spectrum, across the visible spectrum, across the infrared spectrum, or combinations thereof; and
each wire having a real part of the refractive index $n_W \geq 1.7$ and an extinction coefficient $k_W \leq 0.1$, across the ultraviolet spectrum, across the visible spectrum, across the infrared spectrum, or combinations thereof; and
≥0.1% and ≤50% of atoms in the wire being part of organic moieties.

16. The optical device of claim 15, wherein the substrate and the wire each comprise, independently, oxides of hafnium, lead, niobium, tantalum, titanium, tungsten, zirconium, or combinations thereof.

17. The optical device of claim 15, wherein $n_S \geq 2.0$ and $n_W \geq 2.0$.

18. The optical device of claim 15, wherein a mass percent of the organic moieties in the wire is ≥0.1% and ≤20%.

19. The optical device of claim 15, wherein the organic moieties include —$CH_3$, —$CH_2CH_3$, or both.

20. The optical device of claim 15, wherein all organic moieties include ≤3 carbon atoms.

* * * * *